July 30, 1963
J. M. SADOWSKI
3,099,738
SAW REPAIR APPARATUS
Filed March 7, 1961
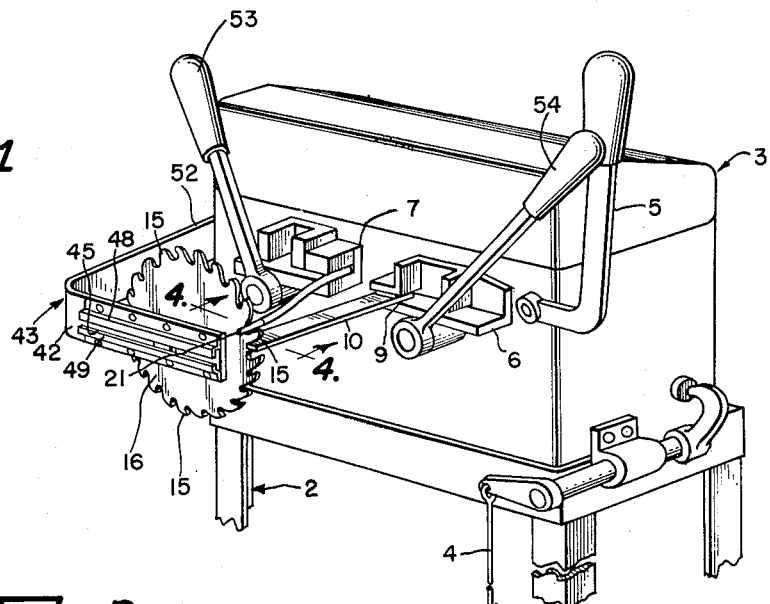
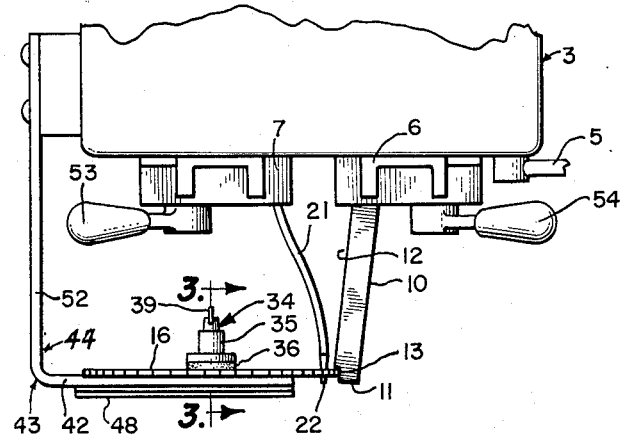
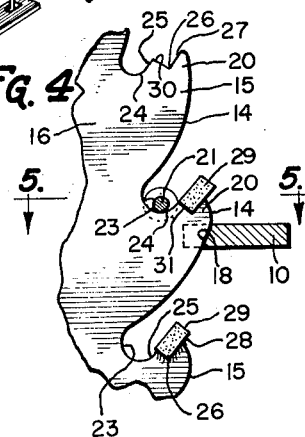
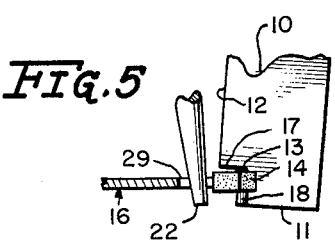
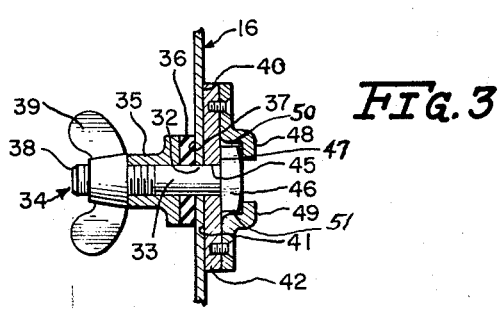
INVENTOR.
John M. Sadowski
BY
John J. Kowalik
Atty.

United States Patent Office 3,099,738
Patented July 30, 1963

3,099,738
SAW REPAIR APPARATUS
John M. Sadowski, 1119 N. Pulaski Road,
Chicago 51, Ill.
Filed Mar. 7, 1961, Ser. No. 93,974
3 Claims. (Cl. 219—85)

This invention relates to a novel apparatus for repairing saws and more specifically to circular saws.

Circular saws comprise a series of peripheral teeth which are tipped with carbide inserts providing the cutting edges. These tips either become dull in use or break off and it is a primary object of this invention to provide a novel fixture or jig which is adaptable for use with a conventional band saw welder and provides novel and handy equipment facilitating repair of circular saws.

The invention contemplates the provision of a novel support which may be mounted upon a suitable bench or the like which may also carry the welder, the support comprising an arm extending generally parallel to the plane of movement of the clamping jaws of the welder and adjustably supporting a circular saw generally parallel to the plane, each jaw supporting a contact electrode, one of which is designed to fit into the concavity between the teeth and the other to contact the trailing edge of the tooth to be repaired, both electrodes being closely spaced from each other with the tooth to be repaired intervening, the jaws being spring biased to effect adequate engagement of the electrodes with the leading and trailing edges of the tooth to provide good electrical contact therewith in the vicinity of the notch which forms a pocket for the carbide insert so that the immediate portion of the tooth is heated with the welding current thus minimizing untempering of the remainder of the blade.

The invention specifically comprehends the provision of a novel electrode with a tapered outer end so as to admit its insertion into various spacings between the teeth.

These and other objects and advantages inherent in and encompassed by the invention will become more readily apparent from the specifications and the drawings wherein:

FIGURE 1 is a perspective view illustrating the invention applied to a band saw welder.

FIGURE 2 is a fragmentary enlarged plan view of the apparatus;

FIGURE 3 is an enlarged sectional view taken essentially on line 3—3 of FIGURE 2;

FIGURE 4 is an enlarged fragmentary sectional view on line 4—4 of FIGURE 1; and

FIGURE 5 is a sectional view taken substantially on line 5—5 of FIGURE 4.

Describing the invention in detail and having particular reference to the drawings, there is shown a support bench 2 mounting a band saw welder generally designated 3 which includes a suitable foot operated switching linkage 4 for turning it on and off and also a hand operated switch handle 5. The welder includes a pair of electrode clamps 6 and 7 which are relatively spring biased to move toward each other in a horizontal plane.

In the instant invention the clamp or jaw 6 is clamped to one end 9 of a flat bar shaped electrode 10 which at the outer end 11 of its lateral edge 12 is provided with a notch 13 which admits therein the trailing edge 14 of a selected tooth 15 of a rotary saw blade generally designated 16.

The notch or slot 13 is defined by a transverse and inboard edge 17 and longitudinal edges 18 the longitudinal edge 18 being preferably downwardly beveled to conform to the contour of the trailing edge 14 of the tooth 15 and contacting the tooth in the vicinity of its tip end portion 20 to insure good conductivity of the heating current and localize it in the region of the tip portion 20 in the passage of the current to the round or pointed electrode 21, tapered toward its outer end 22 and which inwardly of this end fits complementally into the valley or tooth cavity profile 23 against the base or root end portion 24 of the leading edge 25 of the tooth 15.

The leading edge 25 of the tooth 15 comprises an insert confining notch 26 in its tip 20 with an outwardly directed leading edge 27 affording a backing for the back side 28 of the cutting tip insert 29 and the notch having an inner edge 30 directed toward the tooth thereahead and providing a seat for the inner edge 31 of the insert. The contacting edges of the insert and notch are suitably brazed to each other by suitably fluxed silver solder or the like which is melted upon the application of the heating current through the electrodes which are spring biased against opposite sides of the tooth.

The blade 16 has a central aperture 32 admitting the shank portion 33 of a mounting screw 34 therethrough, the screw mounting a collet 35 which engages a fiber washer 36 against the inner side 37 of the blade 16, the screw being threaded at its inner end 38 and mounting a wing nut 39 which upon being threaded onto the shank 33 draws the collet and washer 36 against the blade and snugly engaging the outboard side 40 of the blade 16 with the inner side 41 of a rectilinear arm portion 42 of the mounting arm 43 of the adapter generally designated 44. The shank 33 passes through a horizontal elongated slot 45 in portion 42 which parallels the plane of the blade and merges into a head 46 which bears against the outer side 47 of the arm portion 42, the head being non-round, preferably square, and being guided between tracks 48 and 49 which engage the upper and lower edges 50 and 51 of the head to prevent its rotation. The tracks are located along the portion 42. The portion 42 merges into a mounting or fastening portion 52 which is secured to the support bench.

It will be readily realized that the elongated slot 45 permits positioning of the mounting means 34 along the length of arm portion 42 to mount blades of various size in position for locating the blade in proper relation to the electrodes each of which is movable to locked position by its associated operating handle 53 and 54.

It will be appreciated that after setting up the blade in the fixture and engaging the electrodes as shown with a selected tooth, the current is applied to heat the tip of the respective tooth. Thus the solder is melted and the defective cutting tip or insert is removed. Then a new insert or tip is applied to the notch with suitable flux and solder and the welding current turned on until the tip is brazed to the tooth. Upon completing the operation the electrodes are retracted from the tooth, the mounting bolt 34 is loosened and the disc rotated to a position locating the next tooth in alignment with the electrodes which are then manipulated to embrace the tooth as heretofore. The process is repeated entirely around the blade.

Having disclosed a preferred embodiment of the invention, it will be understood that various other forms of the invention will become readily apparent to those skilled in the art within the scope of the appended claims.

What is claimed is:

1. For use with a band saw welder having a pair of electrode jaws biased toward each other in a substantially horizontal plane, a circular saw repairing fixture comprising an arm supported in a substantially horizontal plane and spaced horizontally away from the jaws in general alignment therewith and having an elongated slot generally parallel to the plane of movement of the jaws, a first electrode connected to one jaw and having an arcuate contour for substantially complementally fitting within a fillet of a tooth to be repaired, a second electrode having a saw tooth-engaging beveled contact edge to engage opposite said first electrode.

2. In a circular saw repairing fixture for use with a band saw welder having a pair of electrode jaws movable relatively toward each other, an arm structure adapted to be supported adjacent to said jaws having means for supporting a circular toothed saw generally parallel to the movement of the jaws, and a pair of saw-tooth engaging electrodes clamped in the jaws and extending transversely of the arm, one of the electrodes comprising a saw-tooth fillet-entering portion tapered toward its outer end.

3. An adapter for repairing circular saws of different diameters with a band saw welder of the type having a pair of electrode jaws movable relatively toward each other, a circular saw-carrying support disposed at one side of the jaws and having means for moving the saw transversely of the jaws in a generally horizontal plane, a tooth-engaging electrode connected to each jaw and extending toward the support, and movable with the jaws generally parallel to movement of the saw.

References Cited in the file of this patent
UNITED STATES PATENTS

| | | |
|---|---|---|
| 2,600,034 | Weingart | June 10, 1952 |
| 2,673,279 | Drake | Mar. 23, 1954 |
| 2,823,295 | Wilcox | Feb. 11, 1958 |